Patented Oct. 23, 1928.

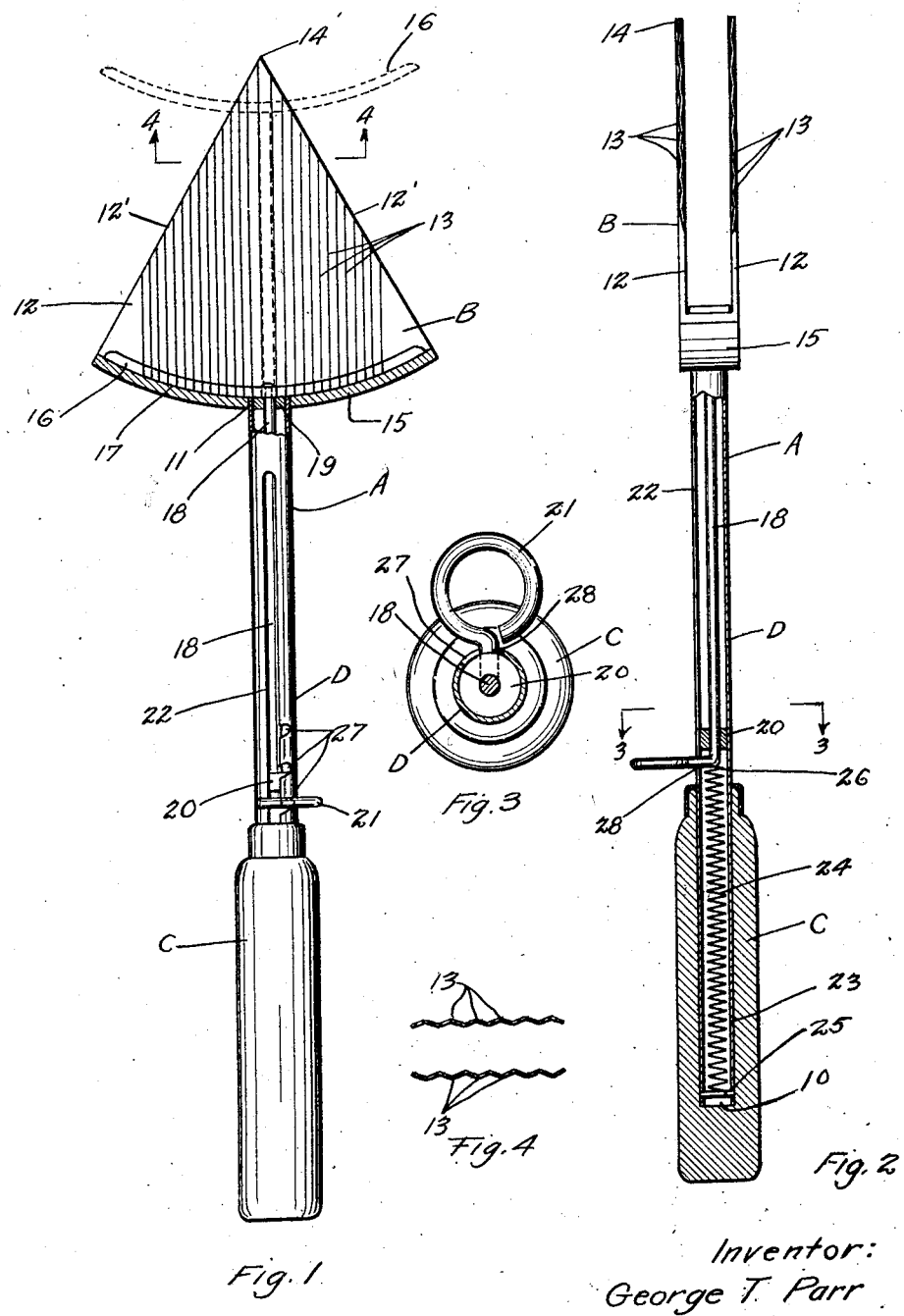

1,688,595

UNITED STATES PATENT OFFICE.

GEORGE T. PARR, OF ST. PAUL, MINNESOTA, ASSIGNOR, BY MESNE ASSIGNMENTS, TO PI-ALAMODER, INC., OF ST. LOUIS, MISSOURI, A CORPORATION OF MISSOURI.

ICE-CREAM SCOOP.

Application filed May 24, 1922. Serial No. 563,235.

My invention relates to ice cream scoops which are adapted to be used for removing a predetermined amount of ice cream from the bulk container in a quick and easy manner. The scoop is of a simple inexpensive construction having means for facilitating the ejecting or emptying of the scoop in a novel manner to deposit the ice cream contained in the same into a suitable container.

The invention includes a receiving scoop which is provided with an ejector blade adapted to be released and moved automatically at the moment it is released into a position to slide the contents out of the scoop.

It is also a feature of the invention to provide means for holding the ejector in a predetermined set position so that the scoop will only contain a certain predetermined amount.

It is also a feature of the invention to provide means for causing the contents of the scoop to be ejected straight out of the same without skidding, thus affording a container to be readily filled from the scoop.

All of the features of the invention will be clearly and specifically set forth in the following specification and claims.

In the drawings illustrating the application of my invention in one form:—

Figure 1 is a side view of my scoop, a portion of which is illustrated in cross section.

Figure 2 is an illustration of another position of the scoop in which a portion is illustrated in cross section.

Figure 3 is a section on line 3—3 of Figure 2.

Figure 4 is a sectional view taken on line 4—4 of Fig. 1.

I have designed my scoop to be of a very simple inexpensive construction and so that it can be operated quickly, with the least possible annoyance to the dealer in handling ice cream.

The drawings illustrate the scoop A in its entirety which is provided with an ice cream receiving compartment B connected to a handle portion C by means of the tubular member D.

The tubular member D extends into the recess 10 of the handle portion and the ice cream compartment B is rigidly secured to the outer end of the same at 11 either by a thread or other suitable well-known means.

The compartment B is formed with side walls 12 which are formed of thin sheet material and as illustrated in the drawings are in the form and shape of a sector of a circle. It is obvious, however, that these walls can be of any suitable shape. A portion of the inner surface of the side walls 12 is formed corrugated or with serrations 13, which extend from the base of the compartment towards the point 14 or longitudinally of the scoop A.

The side walls 12 are joined together by means of a back 15 which connects at 11 with the member D and which is curved to provide the particular shape illustrated in the drawings. This wall 15 may extend straight if it is so desired, and forms the base of the compartment B while the other two sides of the same are open to receive the ice cream as the scoop A with its compartment B is forced into the same in the act of filling the compartment.

An ejector plate 16 of a similar shape to the wall 15 is positioned between the walls 12 and is provided with serrations 17 which fit into the serrations 13 so as to guide the ejector in its longitudinal movement in the compartment B. This ejector plate 16 extends approximately the length of the wall 15 so that when it is forward from its backward position it will entirely discharge or eject all the contents of the compartment B of the scoop.

The ejector plate 16 is connected to a rod 18 which extends through the supports 19 and 20 positioned within the tubular member D. The inner end of the rod 18 is formed with a right-angularly extending eye or finger piece 21 while the tubular member D is formed with a slot 22 to permit the rod to extend through the same and allow it to be moved back and forth when desired. The support 20 is rigidly secured in a suitable manner to the inner end of the rod 18 so as to move freely with the same in the tubular member D.

Within the compartment 23 formed by the portion of the tubular member D which extends into the handle C is positioned a coil spring 24 which is held in position within the tubular member D by the washer 25 at one end while the other end of the spring bears against the end 26 of the rod 18. This spring 24 has a tendency to force the ejector plate 16 into the position illustrated in dotted lines in Figure 1 so as to eject the contents of the compartment B of the scoop.

A series of notches 27 are formed in the side of the slot 22 in a manner to engage the shank or portion 28 of the rod 18 which extends through the slot 22 so that when the loop or finger piece 21 is engaged and drawn backward to compress the spring 24 by slightly turning the rod to one side the shank 28 will engage into the desired position in one of the notches 27. These notches position the ejector plate 16 within the compartment B so that if only a small amount of ice cream is desired to be filled within the compartment then the shank 28 of the rod 18 is inserted in the forward notch, and if a larger amount is desired it is set into one of the other notches. In this manner a predetermined amount of ice cream can be filled within the compartment B when it is desired. These notches are adapted to securely hold the ejector plate into position and in readiness so that when the finger piece 21 is engaged while it is held in backward position in one of these notches, and pushed to one side into the slot 22 as soon as it is released from the notch the spring 24 will automatically force it forward in the slot 22 and push the ejecting plate into the forward position in the compartment B.

In using the scoop A the ejector plate is drawn back into the position desired by compressing the spring 24 and placing the shank 28 into engagement in one of the notches 27. The scoop is then filled with ice cream by forcing the compartment B with its cutting walls 12 into the bulk ice cream to pack and fill the ice cream firmly between these walls. While the scoop is still in the ice cream it is twisted or bent slightly to break from the bulk ice cream the portion along the edges 12′ of the walls 12 and withdrawn. The ice cream packed between the walls 12 will readily remain in position until the shank 28 is released from the respective notch 27 whereupon the spring 24 will automatically push the contents of the compartment B out of the scoop. Should the spring not be strong enough to start the ice cream from the compartment B a slight push on the finger piece 21 at the time it is released will cause it to move forward and the spring will immediately function to eject the ice cream.

It is of primary importance in a device of this nature to provide a simple inexpensive means for removing ice cream from the bulk container and with this in mind I have endeavored to provide a construction which will include means for quickly removing the desired amount of ice cream from the bulk container and discharging it readily into a salable, edible container of the desired shape. The serrations 13 of the compartment B cause the contents within the scoop of compartment B to be pushed straight forward and prevent side skidding so that the point 14 of the compartment can be held directly over the opening of the container and the ice cream from the compartment discharged very easily within the same.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims:

I claim:—

1. A scoop for the purposes specified including a receiving compartment formed by a pair of parallel cutting blades, a closure across the base of said blades, an ejector means between said blades, a handle for supporting said compartment longitudinally extending serrations formed in said blades adapted to guide said ejector and means for moving said ejector into ejecting position.

2. An ice cream scoop comprising a handle member, a pair of parallel sector shaped plates secured thereto, an ejector positioned between said parallel plates and adapted to move from the arcuate portion thereof to the point thereof, parallel serrations formed in said plate and extending longitudinally from said arcuate portion toward the point thereof and corresponding serrations formed in said ejector engaging said plate serrations for guiding said ejector in its outermost positions.

GEORGE T. PARR.